AMPLIFIER NETWORK

Filed Dec. 2, 1947

INVENTOR.
Jerre D. Noe
BY Flehr & Swain
ATTORNEY.

Patented Jan. 1, 1952

2,580,822

UNITED STATES PATENT OFFICE 2,580,822

AMPLIFIER NETWORK

Jerre D. Noe, Palo Alto, Calif., assignor to Hewlett-Packard Company, Palo Alto, Calif., a corporation of California Application December 2, 1947, Serial No. 789,153

1 Claim. (Cl. 179—171)

This invention relates generally to electronic amplifier networks, and particularly to amplifiers applicable to video and audio frequencies.

In a co-pending application filed of even date in the name of Howard M. Zeidler, and entitled "Amplifier Network," now Patent No. 2,566,508, issued September 4, 1951, there is disclosed an improved amplifier applicable to video and audio frequencies, and characterized particularly by a relatively flat amplification gain over a wide range of operating frequencies. A feature of the Zeidler invention is that loss of gain at low frequencies due to screen and/or cathode degeneration and resulting from inadequate bypassing, is compensated for by an increase in the plate circuit gain of the tube. The preferred embodiment disclosed in said co-pending application provides a by-pass condenser across the cathode resistor, in order to prevent undesirable cathode degeneration due to return of an appreciable portion of the plate current to the cathode through the cathode resistor, and to the capacitance formed by the output capacitance of one amplification stage plus the input capacitance of the succeeding stage. In certain instances it is desirable however to use the cathode resistor as a feedback element, and in such instances it is undesirable or impractical to bypass the cathode resistor for high frequencies.

It is a general object of the present invention to provide an electronic amplifier network of the type disclosed in said co-pending Zeidler application, and which will be adapted for operating conditions where it is undesirable or impractical to by-pass the cathode resistor for high frequencies, as for example where the cathode resistor is used as a feedback element.

Additional objects and features of the invention will appear from the following description in which the preferred embodiment has been set forth in detail in conjunction with the accompanying drawing.

Referring to the drawing.

Figure 1:
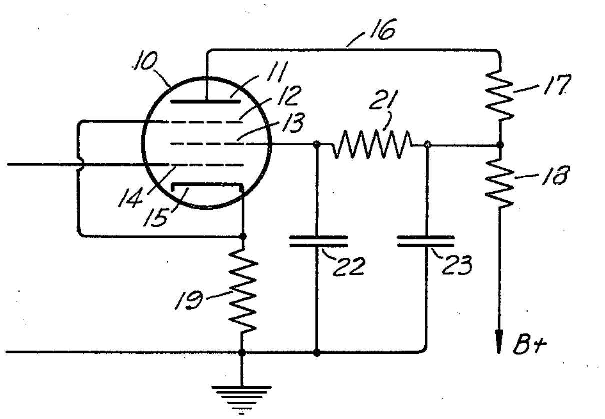
Figure 1 is a circuit diagram illustrating a one stage amplifier network incorporating the present invention.

The single amplifier stage illustrated in Figure 1 comprises a vacuum tube pentode 10 consisting of the plate 11, suppressor grid 12, screen grid 13, control grid 14, and cathode 15. Input voltages are applied to the control grid 14 as indicated. The plate circuit includes a conductor 16, the two resistors 17 and 18, and a source of B battery or plate voltage as indicated. The negative side of the plate voltage source is presumed to be grounded. Biasing resistor 19 connects the cathode 15 with ground. Resistor 21 connects the screen grid 13 to a point between the resistors 17 and 18. A condenser 22 connects from the screen grid 13 to ground, and another condenser 23 connects from the point of connection between resistors 17 and 18, to ground. One side of the input is shown connected to the control grid 14 and the other side to ground.

Figure 2:
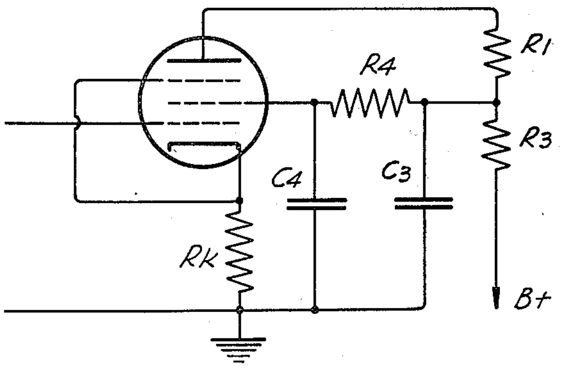
Figure 2 is a circuit diagram like Figure 1 but with symbols applied as used in formulas contained in this specification.

Referring to the symbols applied to Figure 2, the gain of the amplifier network described above, for the higher frequencies at which by-passing condensers $C_3$ and $C_4$ are effective, can be expressed by a formula as follows:

(Equation 1)

$$\text{Gain (High Freq.)}=\frac{G_m R_1}{1+(G_m+G_{sg})R_k}$$

where $G_m$=Mutual conductance of the control grid with respect to the plate current.

$R_1$, $R_k$=The values of resistors $R_1$ and $R_k$.

$G_{sg}$=Mutual conductance of the control grid with respect to the screen grid current.

The above assumes that (Equation 2)

$$G_m=\left[\frac{\delta i_p}{\delta e_g}\right] e_p, e_{sg}\text{—Constant}$$

(Equation 3)

$$G_{sg}=\left[\frac{\delta i_{sg}}{\delta e_g}\right] e_p, e_{sg}\text{—Constant}$$

(Equation 4)

$$\mu_{sg}=\left[\frac{\delta e_{sg}}{\delta e_g}\right] i_{sg}, i_p\text{—Constant}$$

where $\delta i_p$=Incremental plate current.

$\delta e_g$=Incremental control grid voltage.

$e_p$=Instantaneous value of varying components to plate voltage.

$e_{sg}$=Instantaneous value of varying components of the screen-grid voltage.

$i_p$=Instantaneous value of varying components of plate current.

$i_{sg}$=Instantaneous value of varying components of screen grid current.

$\delta i_{sg}$=Incremental screen grid current.

$\mu_{sg}$=Amplification factor of the screen grid with respect to the control grid.

$\delta e_{sg}$=Incremental screen grid voltage.

At low frequencies where condensers $C_3$ and $C_4$ may be considered as an open circuit, two compensating effects occur. The first effect is screen degeneration due to resistors $R_4$ and $R_3$ causing a reduction in gain. The second effect is an increase in effective load resistance in plate circuit from $R_1$ to approximately $(R_1+R_3)$. If the effect of the degeneration is taken into account, it is found that the cathode current $i_b$ is equal to (Equation 5)

$$i_b=\frac{e_i(G_m+G_{sg})}{1+R_k(G_m+G_{sg})\left(1+\frac{1}{\mu_{sg}}\right)+\frac{R_3}{\mu_{sg}}(G_m+G_{sg})+\frac{R_4G_{sg}}{\mu_{sg}}}$$

With a knowledge of the total cathode current $i_b$ and a knowledge of the partition of this current between the screen and plate circuit, the low frequency gain may be written directly as (Equation 6)

$$\text{Gain (Low Freq.)}=\frac{-G_mR_1\left[1+\frac{R_3}{R_1}\cdot\frac{G_m+G_{sg}}{G_m}\right]}{1+R_k(G_m+G_{sg})\left(1+\frac{1}{\mu_{sg}}\right)+\frac{R_3}{\mu_{sg}}(G_m+G_{sg})+\frac{R_4G_{sg}}{\mu_{sg}}}$$

I have discovered that when the various components of the network are proportioned in accordance with certain mathematical formulas, the gain of the stage will be constant for the normal high frequency cut-off, down to as low as direct current. These mathematical formulas are as follows:

(Equation 7)

$$R_3=R_4\left[\frac{G_{sg}}{G_m+G_{sg}}\right]\left[\frac{G_mR_1}{\mu_{sg}-G_mR_1+R_k(G_m+G_{sg})(\mu_{sg}+1)}\right]$$

(Equation 8)

$$C_4=C_3\left[\frac{G_{sg}R_1}{\mu_{sg}+R_k(G_m+G_{sg})(\mu_{sg}+1)}\right]$$

The above Equation 7 can be derived by equating the Equations 1 and 6 for the high and low frequency gains. Equation 8 expresses the value of condenser $C_4$ to provide constant gain for the transition region between the high frequency gain and the low frequency gain.

As an example of a network having its components proportioned according to the above formulas (Equations 5 and 6), values can be used as follows:

$R_1$=5,000 ohms
$G_m$=4,000 micromhos
$G_{sg}$=1,300 micromhos
$\mu_{sg}$=31
$R_k$=150 ohms
$R_3$=755 ohms
$R_4$=5,600 ohms
$C_3$=4,350 $\mu\mu$fd.
$C_4$=500 $\mu\mu$fd.

It has been noted that the network is not extremely critical with respect to the values of condensers $C_3$ and $C_4$. The input admittance to the network is substantially larger at higher frequencies when condenser $C_4$ is removed, than when this condenser is present, due to the "Miller effect" between the grid and screen grid. Therefore it is desirable to select a value for condenser $C_4$ which is sufficiently large to effectively by-pass the screen grid to ground at a frequency substantially lower than that at which the input admittance of the stage would produce serious loading on the preceding stage.

It will be evident that the network described above eliminates the necessity for a large by-pass condenser from screen grid to ground as used in conventional amplifiers. The minimum values of $C_3$ and $C_4$ are relatively small, allowing use of physically small units in amplifier construction. Furthermore the constant value of amplifier gain maintained over a wide range of frequencies by choosing the circuit components in accordance with the mathematical relations stated in this application results in zero phase shift due to the screen grid by-pass elements at all frequencies down to zero.

I claim:

In an electronic amplifier network for amplifying a wide range of frequencies including relatively low audio frequencies, the network incorporating a vacuum tube having plate, screen grid, control grid and cathode elements; of a plate circuit including a source of plate voltage and two serially connected resistors ($R_1$ and $R_3$); another resistor ($R_4$) having its one terminal connected to the screen grid and its other terminal connected to a point between the two first named resistors, whereby one of said first named resistors ($R_1$) is connected between the plate and said third resistor, a fourth biasing resistor ($R_k$) connected between the cathode and the negative side of the plate voltage, a condenser ($C_4$) connected between the screen grid and the negative side of the plate voltage source, a second condenser ($C_3$) connected from the point between the two first named resistors to the negative side of the plate voltage source, the values of said resistors and said condensers being selected to conform substantially to a mathematical relationship expressed by the equation $$R_3=R_4\left[\frac{G_{sg}}{G_m+G_{sg}}\right]\left[\frac{G_mR_1}{\mu_{sg}-G_mR_1+R_k(G_m+G_{sg})(\mu_{sg}+1)}\right]$$

and also the equation $$C_4=C_3\left[\frac{G_{sg}R_1}{\mu_{sg}+R_k(G_m+G_{sg})(\mu_{sg}+1)}\right]$$

where $R_1$, $R_3$ and $R_4$ represent the values of the above identified resistors, $C_3$ and $C_4$ represent the values of the above identified condensers, $G_m$ is the mutual conductance of the control grid with respect to the plate current, $G_{sg}$ is the mutual conductance of the control grid with respect to the screen grid current, and $\mu_{sg}$ is the amplification factor of the screen grid with respect to the control grid.

JERRE D. NOE.

REFERENCES CITED

The following references are of record in the file of this patent:

UNITED STATES PATENTS

| Number | Name | Date |
|---|---|---|
| 2,218,925 | Roberts | Oct. 22, 1940 |
| 2,305,861 | Gehman | Dec. 22, 1942 |
| 2,354,537 | Norgaard | July 25, 1944 |
| 2,392,415 | Soller | Jan. 8, 1946 |

OTHER REFERENCES

RCA—"Receiving Tube Manual" (1940 Edition) Figure 14—5 (p. 207). (Copy in Patent Office Library.)